UNITED STATES PATENT OFFICE.

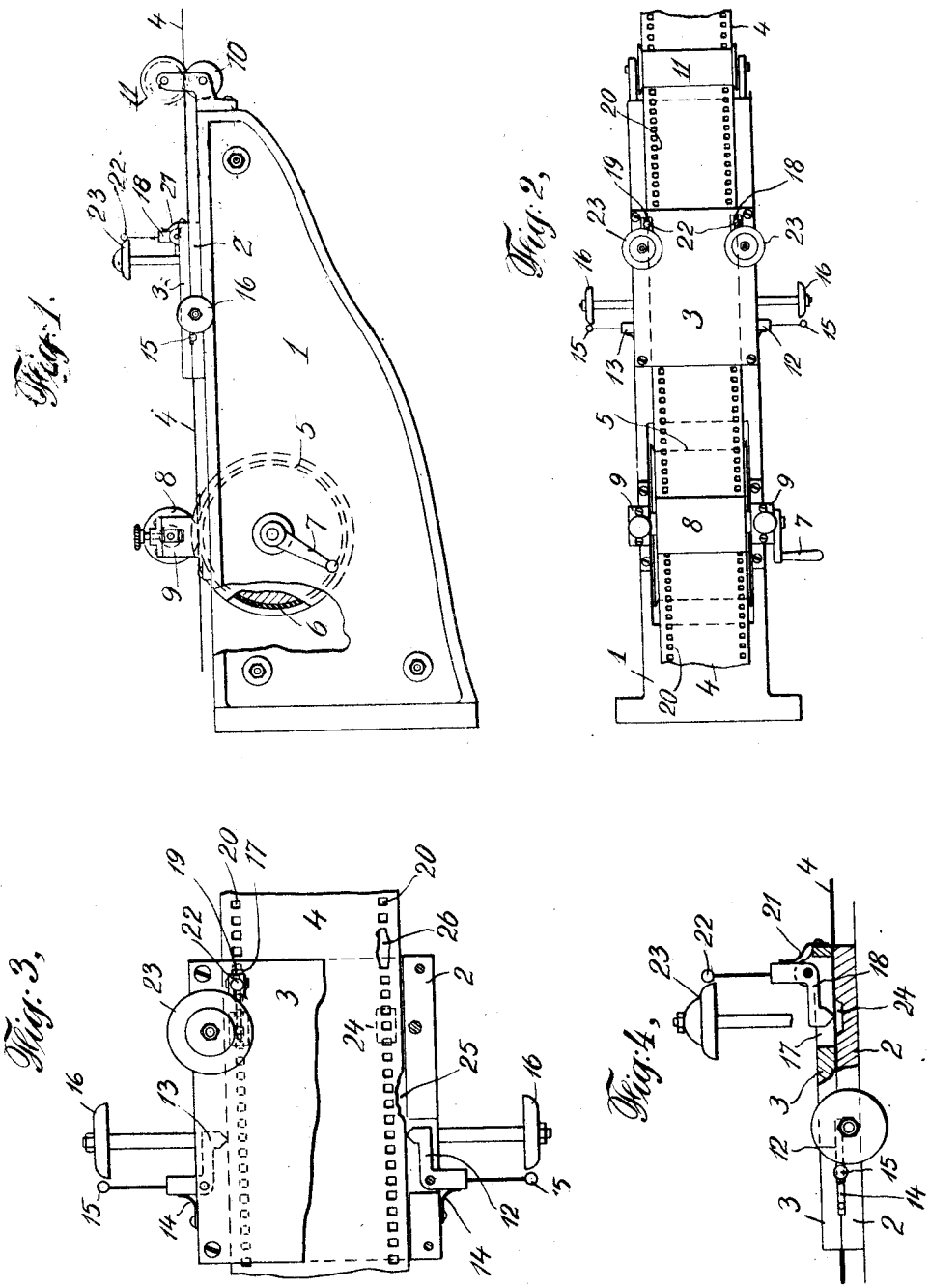

ROGER NICOLET, OF PLAINFIELD, NEW JERSEY.

MACHINE FOR DETECTING DEFECTS IN MOTION-PICTURE FILMS.

1,076,691.  Specification of Letters Patent.  Patented Oct. 28, 1913.

Application filed October 31, 1912. Serial No. 728,933.

*To all whom it may concern:*

Be it known that I, ROGER NICOLET, a citizen of the Republic of France, and a resident of Plainfield, in the county of Union and State of New Jersey, have invented a certain new and useful Machine for Detecting Defects in Motion-Picture Films, of which the following is a specification.

My invention relates to apparatus for detecting defects in motion picture films. As is well known, such films are commonly provided with rows of perforations, usually located at the two edges of the film strip. It sometimes happens that the edge of the film is torn away opposite one or more of said holes, or that the portions of the film between two or more consecutive holes are torn away. The long film strips now frequently used comprise two or more lengths of film joined together, and it occasionally happens that such a joint or seam is too thick to pass through the projecting machine in which the film is to be used. The apparatus herein illustrated and described is adapted to detect such defects in motion picture films. Obviously, the apparatus is equally adaptable for detecting similar defects in any other strips of flexible material designed to be passed through a machine, and in stating that my machine is a machine for detecting defects in motion picture films, I do not intend thereby to limit the use of the machine to detecting defects in such films alone.

My invention consists in a structure comprising one or more movably mounted detector fingers located in a path through which the film or other strip to be inspected may be passed, together with means for moving such a film or other strip past such detecting means, and means, operated by the detecting finger or fingers, for indicating such operation of the detector finger or fingers as is occasioned by the passage of a defect past such finger or fingers.

The object of my invention is to provide simple, automatic mechanism for detecting defects in motion picture films and other flexible strips.

I will now proceed to describe my invention with reference to the accompanying drawings, and will then point out the novel features in claims.

In the drawings: Figure 1 shows a side view of one form of apparatus embodying my invention. Fig. 2 shows a top view thereof. Fig. 3 shows a fragmentary top view, on a larger scale, a portion of the top plate of the film guide having been broken away. Fig. 4 shows a fragmentary longitudinal elevation and partial section of the portion of the apparatus shown in Fig. 3.

In the drawings, 1 designates a suitable support, upon which are mounted two plates, 2 and 3, between which a film strip 4 is to be passed, the said plates 2 and 3 forming a guide for the film strip and a support for the detector fingers hereinafter mentioned.

5 designates a suitable feed roll, preferably provided with a covering 6 of rubber or other elastic or yielding material, said roll 5 being provided with a crank 7 by which it may be rotated; and 8 designates a presser roll, adapted for slight vertical movement in guides 9, this roll 8 serving to press the film strip 4 upon the feed roll 5 and thereby to insure feeding of the film when said roll 5 is revolved. Suitable guide rolls 10 and 11 guide and support the film strip on its passage to the film guide formed by plates 2 and 3. At the sides of the plate 2, I pivot two detector fingers 12 and 13, the ends of these detector fingers being preferably of V-shape or some equivalent contour, as shown. These detector fingers 12 and 13 are pressed against the edge of the film strip 4, by means of suitable springs 14. The detector fingers 12 and 13 have the form of bell cranks, as shown, and at their outer ends carry hammers 15 adapted to strike bells 16, in case said detector fingers encounter breaks in the edges of the film strip.

In the upper guide plate 3 are slots 17 in which are located other detector fingers 18 and 19, these detector fingers 18 and 19 being pivoted to the top guide plate 3, and being located over the rows of perforations 20 of the film strip. These two vertical detector fingers, 18 and 19, likewise have the form of bell crank levers, and at their lower ends are provided with V-shaped projections or projections of other suitable contour, whereby said detector fingers are adapted to enter holes of the film of greater length than the individual perforations of the film. Springs 21 press these detector fingers 18 and 19 against the film. At their upper ends the detector fingers 18 and 19 are provided with hammers 22 adapted to strike bells 23, these bells being preferably of somewhat different form or size than the bells 16, so that the two bells 16 and the two bells 23 have distinctive tones. It is convenient to provide recesses 24, Fig. 4, in the bottom guide plate 2, directly beneath the actuating portions of the detector fingers 18 and 19.

The operation of the machine is as follows: Supposing a film strip to be mounted in the machine, and the feed roll 5 to be rotated, in case there be a defect in one edge of the film, as indicated at 25, Fig. 3, the corresponding horizontal detector finger 12 or 13, will enter such defect, as the film passes the detector finger, causing the hammer 15 of that detector finger to strike its corresponding bell 16. In case the material of the film intervening between two or more of the consecutive holes 20 of the film, has been torn away, as indicated at 26, Fig. 3, the corresponding vertical detector finger, 18 or 19, will enter such defect, as that defect passes underneath such detector finger, such detector finger then striking its corresponding bell, 23. In case the film have a bad joint or seam, such as above referred to, when such bad joint or seam passes underneath the two vertical detector fingers, 18 and 19, both of said fingers will strike their bells. It will be obvious that the detector fingers may operate various other forms of devices for indicating visually or audibly the existence of defects in the strip passing the detect r fingers.

What I claim is:—

1. An apparatus for detecting defects in a motion picture or similar film provided with one or more rows of perforations, comprising means for moving said film to be inspected, detecting means arranged to engage said film yieldably along the line of the perforations thereof, the portion of said detecting means which normally engages said film being shaped and proportioned so as not to enter a normal perforation of the film but to enter an abnormally large perforation, and indicating means arranged to be operated by the entry of such detecting means into the said abnormally large perforation.

2. An apparatus for detecting defects in a motion picture or similar film provided with two rows of perforations, one near each edge, comprising means for moving said film to be inspected, detecting means arranged to engage said film yieldably near each edge along the lines of the rows of perforations, the portion of said detecting means which normally engages said film being shaped so as not to enter a normal perforation of the film but to enter an abnormally large perforation, and indicating means arranged to be operated by the entry of said detecting means into the said abnormally large perforation.

3. An apparatus for detecting defects in a motion picture or similar film comprising means for moving the film to be inspected, and detecting means arranged to engage said film yieldably, said detecting means comprising a movably mounted detector finger, spring-actuated toward the film to be inspected, and indicating means positioned with respect to said detector finger to be out of engagement with said detector finger when the latter is resting normally on the film, but to be engaged by said detector finger when the latter moves abruptly toward the film following abrupt actuation of such finger due to a defect in the film.

4. An apparatus for detecting defects in a motion picture or similar film comprising means for moving the film to be inspected, and detecting means arranged to engage said film yieldably, said detecting means comprising movably mounted detector fingers, arranged to engage the edges of said film, yieldably, and spring-actuated toward the film, and indicating means positioned with respect to said detector fingers to be out of engagement with said detector fingers when the latter are resting normally on the film, but to be engaged by said detector fingers when the latter move abruptly toward the film following abrupt actuation of such fingers due to a defect in the film.

5. An apparatus for detecting defects in a motion picture or similar film provided with one or more rows of perforations, comprising means for moving said film to be inspected, detecting means arranged to engage said film yieldably along the line of the perforations thereof, said detecting means comprising one or more pivotally mounted detector fingers, the portion of said fingers which normally engages said film being shaped and proportioned so as not to enter a normal perforation of the film but to enter an abnormally large perforation and indicating means arranged to be operated by the entry of said detecting means into the said abnormally large perforation.

6. An apparatus for detecting defects in motion picture or similar films comprising means for moving said film to be inspected, and detecting means comprising one or more pivotally mounted and spring-pressed bell crank detecting fingers, adapted to ride over said strip and to enter defects in the same as they pass the detector finger or fingers.

7. An apparatus for detecting defects in a motion picture or similar film, comprising means for moving said film to be inspected, and one or more detector fingers comprising bell crank levers pivotally mounted and spring-pressed to engage said film yieldably, said bell crank lever comprising a rigid arm adapted to engage said film and a hammer carried by the other arm, and indicating means arranged to be actuated by said hammer upon the actuation of said detector finger.

In testimony whereof I have signed this specification in the presence of two subscribing witnesses.

ROGER NICOLET.

Witnesses:
EDWARD FERRAND,
WARREN G. VAN DORN.